April 28, 1964   R. W. LANDEE ETAL   3,131,363
INSTANTANEOUS PHASE-PULSE MODULATOR
Filed May 18, 1960   9 Sheets-Sheet 5

INVENTORS
ROBERT W. LANDEE
EUGENE HOO
BY
*Moody and Goldman*
ATTORNEYS

INVENTORS
ROBERT W. LANDEE
EUGENE HOO
BY
ATTORNEYS

United States Patent Office 3,131,363
Patented Apr. 28, 1964

3,131,363
INSTANTANEOUS PHASE-PULSE MODULATOR
Robert W. Landee, Encino, and Eugene Hoo, Costa Mesa, Calif., assignors to Collins Radio Company, Cedar Rapids, Iowa, a corporation of Iowa
Filed May 18, 1960, Ser. No. 29,974
20 Claims. (Cl. 332—11)

This invention provides a unique phase-pulse modulator capable of obtaining digital phase-shifts virtually instantaneously upon the command of a timing pulse.

Prior types of phase-pulse modulators (also called generators) are described in U.S. Patents No. 2,915,633 to George Barry; No. 2,870,431 to Dean F. Babcock; and No. 2,905,812 to Melvin L. Doelz and Dean F. Babcock, and in U.S. patent application Serial No. 716,206 filed February 19, 1958, now Patent No. 2,994,790, issued August 1, 1961, all assigned to the same assignee as the present invention.

In order to obtain optimum performance in multiplexed phase-pulse systems of the type in U.S. Patent No. 2,905,812, it is necessary for all tones to be phase-shifted at the same instant, as determined by a bit-synchronous timing pulse.

Prior types of phase-pulse modulators using chains of binary-frequency dividers have the advantage of relative structural simplicity and temperature stability over other prior types. However, a disadvantage of said prior modulators is that the timing of their phase-shifts is dependent upon the phasing and frequency of their tone oscillator, as well as upon bit-synchronizing pulses that should have complete control over the timing of the phase-shifts. The tone oscillators in a multiplexed system generally have random phasing with respect to each other. Consequently, simultaneous phase-shifts of multiplexed tones, as commanded by a bit-timing pulse, in fact randomly occur at slightly different instances after the timing pulse.

Furthermore, in said prior modulators, the total time for accomplishing each phase-shift directly varies as functions of: the digital modulation, and of the tone frequency. It is also desirable in a multiplexed phase-pulse system that its phase-shifts not have their durations dependent upon the different tone frequencies, and that the phase-shifts be consummated as quickly as possible without direct dependence upon the modulation, being controlled only by inherent equipment bandwidths.

It is therefore an object of this invention to provide a phase-modulator that can phase-shift its output virtually upon the instantaneous command of a timing pulse.

It is another object of this invention to provide a phase-pulse modulator in which the time for completing a phase-shift can be made independent of the digital modulation.

It is still another object of this invention to provide a phase-pulse modulator in which the time for completion of its phase-shifts is independent of its tone frequency.

It is a further object of this invention to provide a phase-pulse modulator which does not require precision components beyond those required to control the frequency of the tone.

The invention includes an encoding matrix which receives plural channels of digital data to be simultaneously modulated onto a single tone as phase-pulse modulation. The encoding matrix is a type which provides a different output for each input data combination. A binary counter is advanced (or retarded) by an amount controlled by the output state of the encoding matrix at the occurrence of a timing pulse. A parallel-input radix converter receives plural outputs from the binary counter and converts them to a single output corresponding to a particular binary-number setting of the counter. An unmodulated tone is provided through a phase-shifter to obtain the respective phases needed to encode the data by phase-pulse modulation. The respective phases are provided on different leads from the phase-shifter. The radix converter synchronously switches to the output one of the phase-shifter leads at any one time to provide the modulated output of the system. Hence, the switching is bit-synchronously timed, and the amount of an output switched phase-shift is determined by the data input.

Further objects, features and advantages of this invention will become apparent to one skilled in the art upon further study of the specification and the accompanying drawings in which:

FIGURES 2, 2(A), 5, 6, 12, 13, 14 and 16 illustrate details of component modifications within the invention;
FIGURES 11(A)–(F) provide waveforms used in explaining the operation of the invention.

Figure 1:
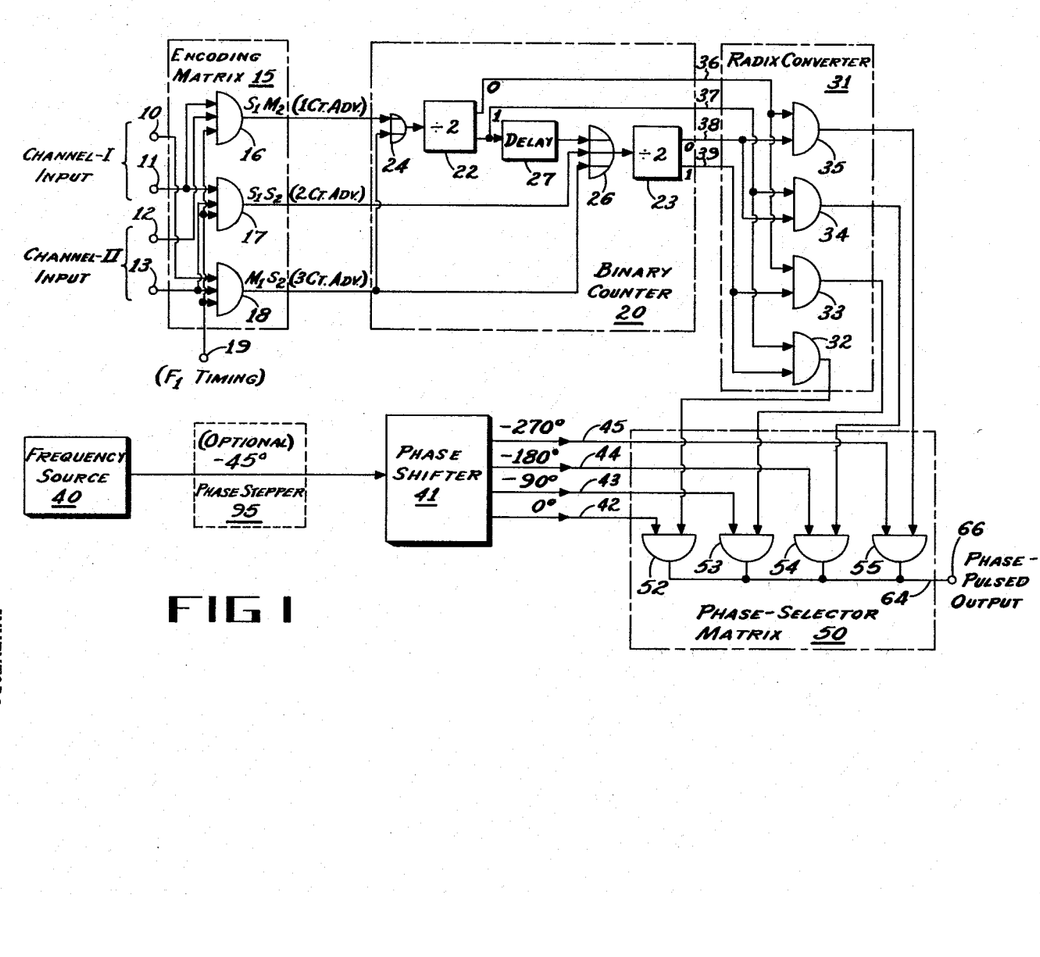
FIGURES 1, 3 and 4 illustrate forms and modifications of the invention.

In FIGURE 1, a form of the invention is shown which can simultaneously modulate two independent binary channels of data upon a single tone derived from a frequency source 40.

Figure 11:
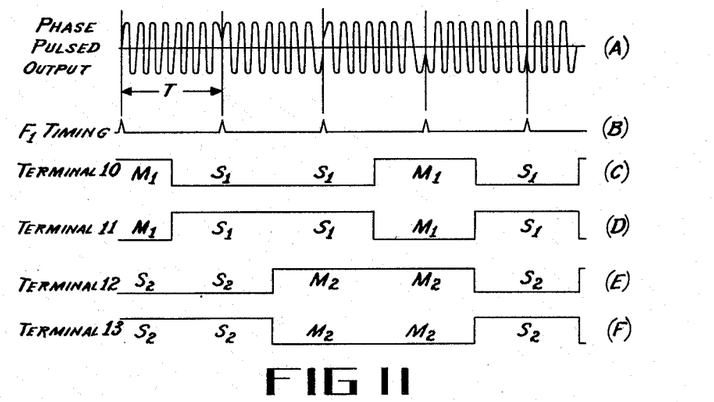

A binary channel I is applied at terminal 10, and its binary data bits are designated as $M_1$ and $S_1$. A terminal 11 also receives the same $M_1$ and $S_1$ data bits of channel I; but they are phase inverted from terminal 10. Likewise a binary channel II comprising data bits $M_2$ and $S_2$ is provided at a terminal 12, and also is provided at a terminal 13 with inverted form. FIGURES 11(C)–(F) illustrate examples of input data waveforms provided at terminals 10–13.

Figures 7, 8:
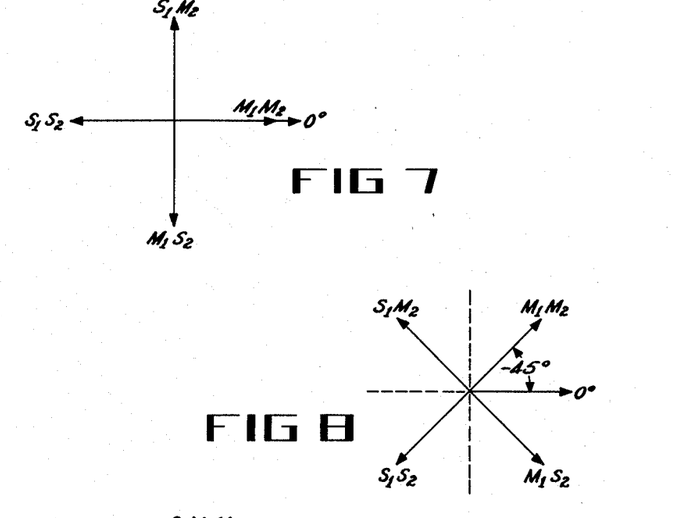
FIGURES 7, 8, 9, 10, 15 and 17 illustrate phase-shifts between adjacent bit-periods of waves modulated by the invention.

FIGURE 7 illustrates a phase-shift modulation code that can be provided in FIGURE 1. It has four phase-shifts, including zero, which can be chosen to modulate the tone. That is, the modulation comprises a synchronous choice of one of the four phase-shifts 0°, 90°, 180° or 270° according to whether the input data combination is $M_1M_2$, $S_1M_2$, $S_1S_2$ or $M_1S_2$, respectively. These four combinations represent all input combinations available from two independent channels. This modulation is defined as phase-pulse herein and is provided at an output terminal 66 in FIGURE 1. FIGURE 11(A) is illustrative of an output phase-pulsed wave; wherein the phase of the tone is maintained constant throughout most of each bit period T, and is quickly phase-shifted at the end of a period T by one of the four coded amounts in FIGURE 7. Thus, the phase-shift represents the modulation, but it is detectable by comparing the constant phase portions of the tone from adjacent periods T.

FIGURE 11(B) illustrates the local bit-timing designated as $F_1$, which is used to synchronize the digital-modulation output at terminal 66.

An encoding matrix 15 receives inputs from channels I and II. It is basically a radix-converter circuit that changes simultaneous binary inputs to a sequential output. It includes a plurality of "and" gates 16, 17 and 18. Input terminals 10–13 are connected with differing combinations to inputs of gates 16, 17 and 18 to obtain enablement only for the code combinations $S_1M_2$, $S_1S_2$, and $M_1S_2$. The combination $M_1M_2$ is recognized by not having any of the gates enabled during a bit period. Each gate also has a timing input connected to a terminal 19, that provides synchronous timing $F_1$. Thus, a timing pulse $F_1$ is passed by that gate which represents a particular code combination, or if no timing pulse is passed during a bit period the combination $M_1M_2$ is signified. The three gates shown in matrix 15 are a minimum number. Four gates could be used to respectively provide pulses representing the four dual-bit combinations.

A binary counter 20 receives the sequential outputs of encoding matrix 15. It is the ultimate function of binary counter 20 in this invention to store the phase of each last-provided data bit so that it can be used as a phase reference for a following modulation phase-shift. The phase-storage function of counter 20 will be explained later. Counter 20 is comprised of two bistable circuits 22 and 23; which are coupled through a delay circuit 27 that avoids coincident problems in triggering by providing a very small delay. "Or" gates 24 and 26 are respectively provided at the inputs to bistable circuits 22 and 23 in order to isolate various triggering inputs provided to them.

Counter 20 is therefore a conventional two-stage binary counter having two pairs of outputs 36, 37 and 38, 39 to represent four binary output counts according to their voltage combinations corresponding to the decade counts 0, 1, 2 and 3.

It is unimportant what particular count exists within counter 20 at any given time. It is only important that the counter be advanced, according to the input data, by a particular number of counts from whatever previous count existed. The count advance determines the phase-pulse modulation function in FIGURE 1 according to the following table:

*Table I*

[Modulation Function]

| Data Combination | Number of Counts Advanced | Phase-shift, degrees |
|---|---|---|
| $M_1M_2$ | 0 | 0 |
| $S_1M_2$ | 1 | 90 |
| $S_1S_2$ | 2 | 180 |
| $M_1S_2$ | 3 | 270 |

Thus, if a code combination $M_1M_2$ is provided, there is no pulsed output from encoding matrix 15; and counter 20 retains its previous count.

A radix converter 31 receives the output of binary counter 20. It translates the form of the count from a binary multi-digit form at the output of counter 20 to a single digit output provided by enablement of one and only one of matrix gates 32–35. Hence, the radix converter in essence converts from a radix of two to a radix of four. Such types of converters are quite common in the art. The most common being the binary-to-decade converter. Basically, encoding matrix 15 and radix-counter matrix 31 are the same type of matrix.

The inputs to the four "and" gates 32–35 of matrix 31 are connected in different combinations to the opposite-phased outputs of binary dividers 22 and 23. Gates 32, 33, 34 and 35 are enabled by the respective output-count states 0, 1, 2 and 3 of counter 20. Since counter 20 is always advanced in count in this embodiment according to Table I, the matrix gates are advanced in the same order 32–35 and repeat, although it may be advanced by either 0, 1, 2 or 3 counts at a time. For example, if gate 33 happens to be enabled at a given time and if the next data input is $M_1M_2$ to indicate no advance, gate 33 remains enabled during the next bit period. On the other hand, if the next data combination is $S_1S_2$, then gate 35 will be enabled, since a two-count advance occurred. And if an $M_1S_2$ is provided after gate 33 is enabled, gate 32 is the following gate enabled, since there is a three-count advance between gate 32 and gate 33.

The four outputs of radix converter 31 are provided respectively to a phase-selector matrix 50. It has "and" gates 52, 53, 54, and 55, each having an enabling input respectively connected to an output of gates 32–35.

Each of the "and" gates in matrix 50 also receives a different phase of a tone-frequency provided from a source 40. A phase-shifter 41 receives the frequency-stable output of source 40 and provides plural outputs 42–45 having different phases of the same frequency. Phase-shifter 41 may be constructed in any of several ways well known in the art. In FIGURE 1, it can provide outputs 42, 43, 44 and 45 having phases 0°, −90°, −180°, and −270° with respect to the phase-shifter input. Leads 42–45 are connected to inputs of gates 52–55, respectively. Hence, one and only one of gates 52–55 is enabled at any one time by any particular count setting of counter 20, so that only one of the four phases can be passed to output terminal 66.

Figure 2:
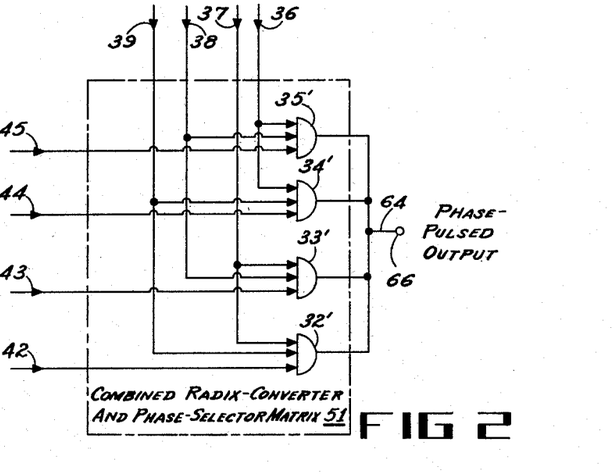

FIGURE 2 illustrates a logical simplification for the system of FIGURE 1, which combines the functions of radix-converter matrix 31 and phase-selector matrix 50 into a single matrix 51 providing a phase-pulsed output to terminal 66. Matrix 51 has "and" gates 32′–35′ which have three inputs each. They are connected to the outputs 36–39 of counter 20 in the same manner as gate 32–35, and the third input of each is connected to a respective output 42–45 of phase-shifter 41.

The phase-shift code illustrated in FIGURE 7 is generally the simplest for the simultaneous modulation of two channels onto a single tone. However, the phase-shift code shown in FIGURE 8 is presently used more often. In the code of FIGURE 8, the four phase-shifts are −45°, −135°, −225° and −315° which correspond to dual-data bits $M_1M_2$, $S_1M_2$, $S_1S_2$ and $M_1S_2$ respectively. The only modification in FIGURE 1 needed to make it compatible with the phase-shift code of FIGURE 8 is to provide means for adding a −45° phase-shift to the output wave at the timing of pulses $F_1$.

The additional −45° of phase-shift can be obtained in a number of ways. One way is to add −45° at output terminal 66 in synchronism with bit timing $F_1$; and this is done in FIGURE 2(A).

Figure 5:
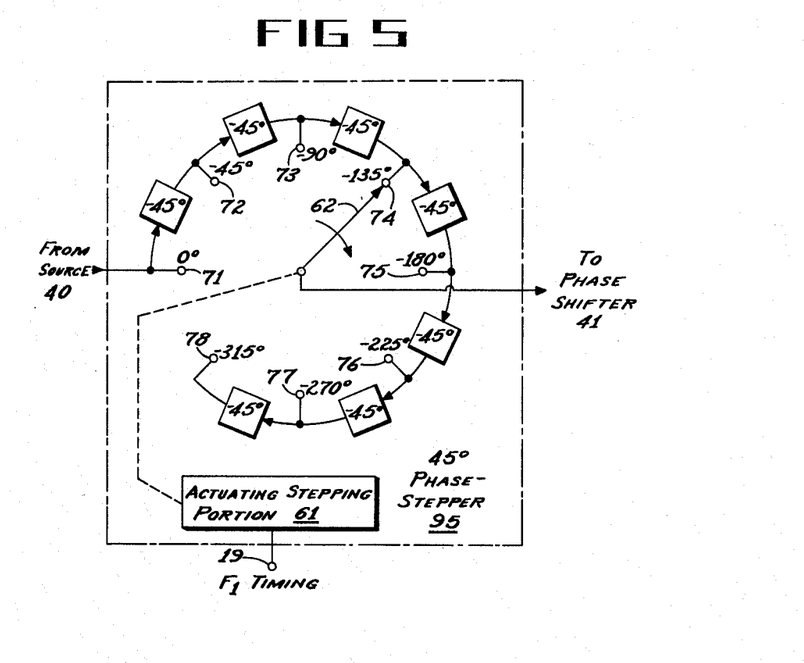
Figure 6:
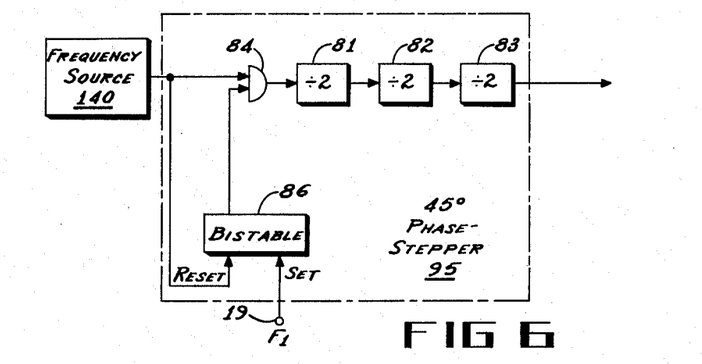

Another way is to add −45° to each of the outputs of phase-shifter 41 in synchronism with timing $F_1$. This way is provided by adding optional item 95 in FIGURE 1. FIGURES 5 and 6 illustrate two ways of providing phase stepper 95. They are discussed later.

Figure 3:
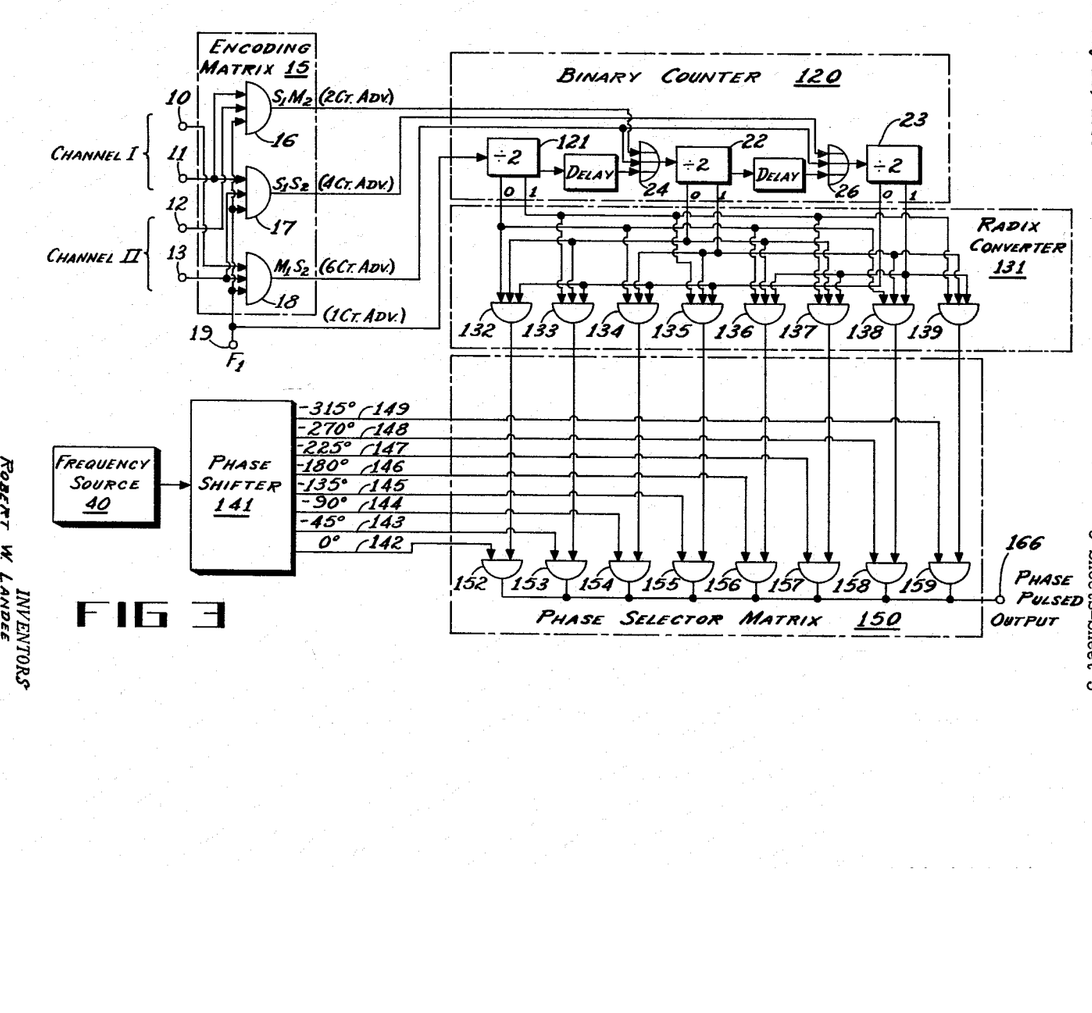

Still another way is to provide eight fixed-phase outputs from phase shifter 41 separated by 45° and have them selected in the proper order by eight respective "and" gates in the phase-selector matrix. This is done in FIGURE 3 by having an eight-count binary counter advance in steps of either 1, 3, 5 or 7. FIGURE 3 uses this method and is explained later.

In FIGURE 5, a −45° phase-stepper 95 is provided by a rotary stepping switch 61 having a single pole 62 that rotatively hops clockwise from stator contact to stator contact at timing $F_1$. A plurality of −45° phase-shifters are connected respectively between adjacent pairs of stator contacts 71–78. Thus, eight output phases are available at the eight contacts, which range from 0° to −315° in −45° intervals. An actuating portion 61 electromechanically moves pole 62 and has an input connected to terminal 19 to receive bit-timing $F_1$. Hence, actuating portion 61 hops pole 62 to the next clockwise contact every time an $F_1$ pulse is received from the timing source. Pole 62 remains at each contact for virtually an entire bit-period T, after which it is quickly stepped to the next following contact. The output from pole 62 thus has a stepped −45° phase-shift at the timing of pulses $F_1$.

FIGURE 6 illustrates another form of −45° stepping phase-shifter 95 which does not require any moving parts, such as in FIGURE 5. In FIGURE 6, three binary dividers 81, 82 and 83 are connected in tandem to a frequency source 140 which has eight times the frequency of source 40 to provide the same output frequency. Source 140 provides a pulsed output to the dividers through a normally-enabled "and" gate 84. It is the purpose of "and" gate 84 to delete one and only one divider input pulse for each received timing pulse $F_1$ provided at terminal 19 in FIGURE 6. The periodic-pulse deletion causes the output of divider 83 to be phase-shifted −45° after each bit-timing pulse $F_1$ is provided. A bistable circuit 86 has a reset input connected to the output of source 140. Thus, bistable 86 is normally reset by each pulse of source 140, which causes the bistable output to normally-enable gate 84. However, a set input of bistable 86 is connected to terminal 19 to receive bit-timing pulses $F_1$. Thus, whenever a bit-timing pulse $F_1$ is received, bistable 86 provides an output which disables gate 84. An $F_1$ pulse over-rides any coincident resetting pulse to set bistable 86. But the disablement can only exist for one pulse from source 140; because as soon as its next pulse is provided, it resets the bistable to again enable gate 84. However, the same source pulse is blocked at gate 84 and does not reach the divider input. The following pulses from source 140 pass through enables gate 84 until the next bit-timing pulse $F_1$ is received.

The phase-stepping system of FIGURE 5 has an advantage over the phase-stepping arrangement of FIGURE 6 combined with FIGURE 1 in that the stepping arrangement of FIGURE 5 can avoid a jitter that may be found in FIGURE 6. That is, the $-45°$ phase-shifts of FIGURE 6 do not occur precisely at timing $F_1$, but depend upon the random occurence of the first pulse from source 140 after a timing pulse $F_1$.

The two channel system in FIGURE 3 obtains the $-45°$ per bit additional phase-shift for the code in FIGURE 8 by having the phase-selector matrix choose the entire output phase-shift from a set of eight different phases that are separated by the stepped amount, $-45°$. Hence, phase-shifter 141 in FIGURE 3 provides eight outputs 142–149 that have fixed phrases of $0°$–$315°$ relative to source 40.

In FIGURE 3, the data inputs and encoding matrix 15 are the same as in FIGURE 1.

However, in FIGURE 3, binary counter 120 has the direct function of obtaining the phrase-shifts shown in FIGURE 8. The $-45°$ stepping function is obtained by adding another binary divider 121 at the input to the counter, which otherwise is the same as counter 20 in FIGURE 1, having bistables 22 and 23 with "or" gates 24 and 26 connected to outputs of encoding matrix 15. However, counter 120 is totally advanced by the counts 1, 3, 5 or 7 corresponding to $M_1M_2$, $S_1M_2$, $S_1S_2$ or $M_1S_2$. Bit-timing $F_1$ is applied to the input of divider 121 to advance the counter by one count per $F_1$ pulse; and counts 0, 2, 4, or 6 are simultaneously added by the corresponding outputs of matrix 15 to provide a total output count of 1, 3, 5 or 7.

Radix converter 131 in FIGURE 3 is a binary-to-octonary converter circuit, wherein one and only one of eight "and" gates 132–139 is enabled by any one of the eight count settings of counter 120 in a manner like that of converter 31 in FIGURE 1. The order of gate enablement with advancing counts is 132, 133, . . . 139 and repeat.

Phase-selector matrix 150 in FIGURE 3 has eight "and" gates 152–159, each having an input connected to a respectively different one of the eight outputs of radix converter 131. Also, gates 152–159 each have another input connected to a respectively different one of the eight outputs of phase-shifter 141. Thus, one and only one of gates 152–159 passes a particular tone phase to output terminal 166 at any one time.

Suppose gate 155 is passing a $-135°$ tone, and $S_1M_2$ data is provided. A three count advance results to enable gate 158 to pass a $-270°$, for a $-135°$ phase-shift that signifies $S_1M_2$ in FIGURE 8. Or suppose $M_1S_2$ is provided after gate 155 is enabled: a seven count advance results to enable gate 154 to pass $-90°$ for a phase-shift of $-315°$, which signifies $M_1S_2$ in FIGURE 8.

Converter 131 and matrix 150 in FIGURE 3 can be combined into a single matrix of the type in FIGURE 2, but with eight "and" gates.

Figure 9:
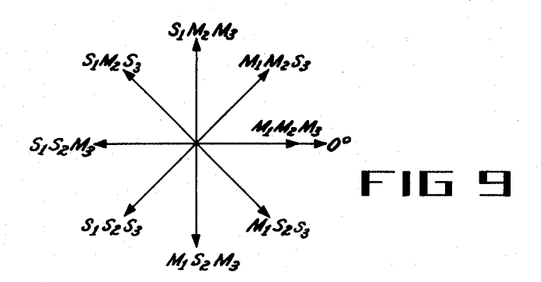
Figure 10:
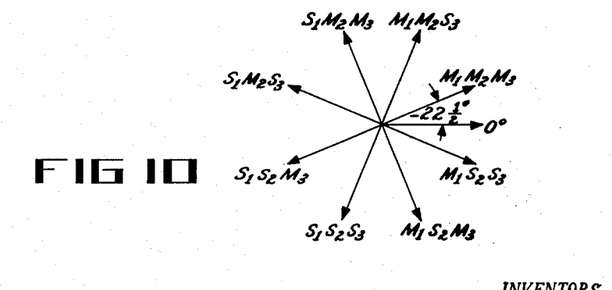

Any number of channels may be phase-pulse modulated by this invention onto a single tone frequency. For any given number of channels, a particular phase-shift code must be assigned, which has a minimum number $2^N$, of phase-shifts; wherein N is the number of simultaneous channels modulated onto the tone. FIGURES 9 and 10 show different codings for three channels having eight available phase-shifts.

Figure 4:
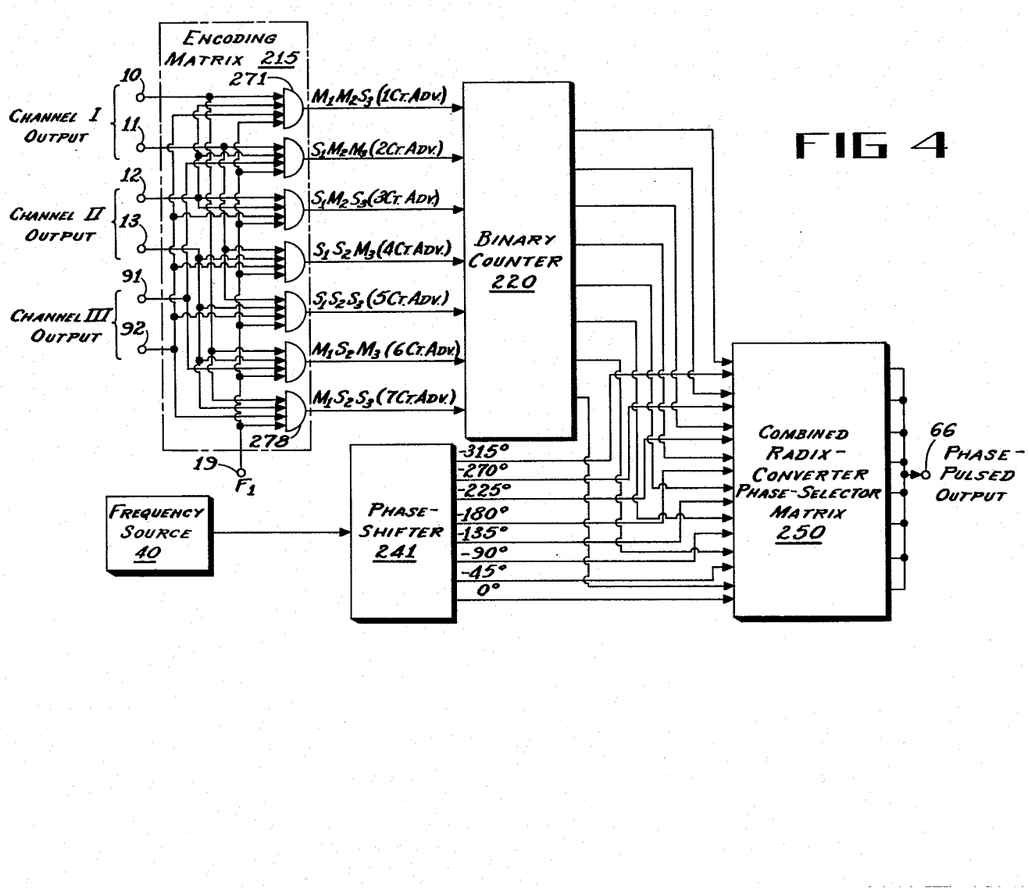

The modulator in FIGURE 4 can modulate simultaneously three binary input channels on the same tone in accordance with the code in FIGURE 9. Phase-shifter 241 in FIGURE 4 provides eight differently phased outputs $0°$ through $-315°$ spaced by $45°$, and they may be the same as those from phase-shifter 141 in FIGURE 3.

The encoding matrix 215 in FIGURE 4 has seven "and" gates, which are the minimum number ($2^N-1$) of "and" gates for N number of channels. They each have three inputs connected in a different combination to the opposite-phased pairs of inputs of the three channels, which are 10, 11; 12, 13; and 91, 92. Also, an input of each gate is connected to bit-timing terminal 19. Hence, one and only one of gates 271–278 is enabled by a particular combination of data-bits simultaneously provided from the three independent channels, except for $M_1M_2M_3$ which has no gate enabled.

A binary counter 220, having eight counts including zero, has seven inputs connected to the seven outputs of encoding matrix 215. The counter inputs respectively advance the counter by the number of counts indicated in FIGURE 4. Thus the counter can be constructed of three bistable circuits connected in tandem along the manner of counter 120 in FIGURE 3. The counter output has a binary-number form as in the other figures.

A combined radix-converter and phase-selector matrix 250 has eight "and" gates having inputs connected in differing combinations to the counter outputs so that it provides a binary-to-octonary conversion like that of converter 131 in FIGURE 3. Also in phase-selector matrix 250, each of the eight "and" gates has an input connected to a differently phased output of phase-shifter 241. Thus, matrix 250 is a combined type like matrix 51 in FIGURE 2. Likewise, only one phase is passed through matrix 250 at any one time to output terminal 66 as in the other embodiments.

The system of FIGURE 4 can be modified easily to provide the phase-coding in FIGURE 10, which is often preferred over the coding in FIGURE 9. The coding in FIGURE 10 can be obtained by adding a $-22\frac{1}{2}°$ additional phase-shift to the phase-shifts in FIGURE 9. Thus a $-22\frac{1}{2}°$ phase-stepping circuit can be connected therein in the same ways as a $-45°$ stepping circuit can be connected into FIGURE 1. Thus, it can be connected to output terminal 66, to the input of phase-shifter 241, or by adding another bistable to counter 220 triggered by $F_1$ pulses with a doubling of the phase-shifts from 241 and of the gates in 250 to accommodate sixteen phase-shifted outputs spaced by $-22\frac{1}{2}°$.

In summary, the *minimum* number of components in the respective portions of the invention are designated for N simultaneous channels per tone in the following table:

*Table II*

| Portion | Portion Sub-Component | Number of Sub-Components |
| --- | --- | --- |
| Encording Matrix | "And" gates | $2^N-1$ |
| Binary Counter | Binary Dividers | N |
| Radix Converter | "And" gates | $2^N$ |
| Phase-Selector Matrix | do | $2^N$ |
| Phase-Shifter | Outputs | $2^N$ |
| Combined Matrix | "And" gates | $2^N$ |

The prior-discussed embodiments each had a binary counter with a delay device separating its bistable sections, in order to prevent coincidence between triggering pulses that might cause error. When the counter's bistable circuits are very-fast acting relative to the signal-bit period $1/F_1$, the delay of the delay element may be made so small as to be insignificant.

Figure 12:
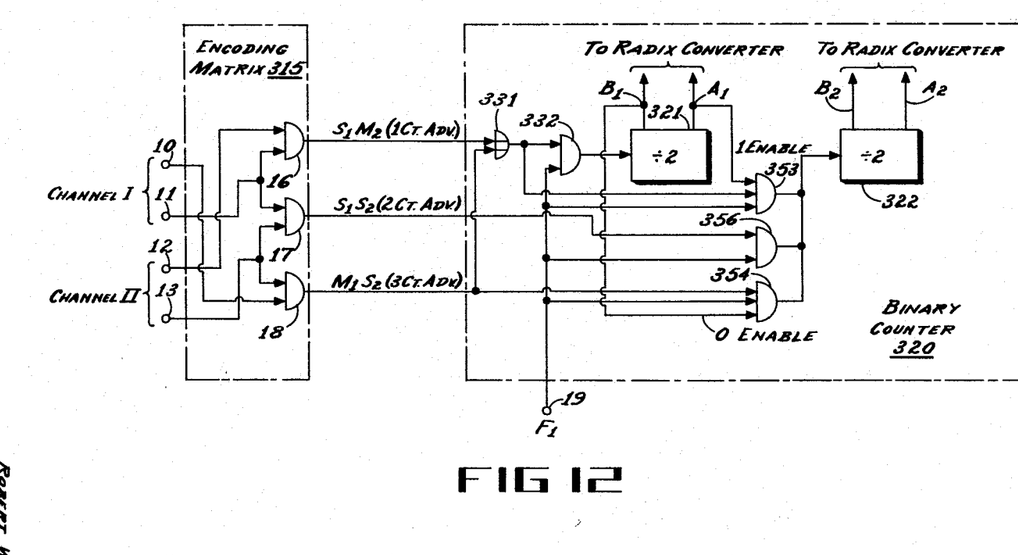
Figure 13:
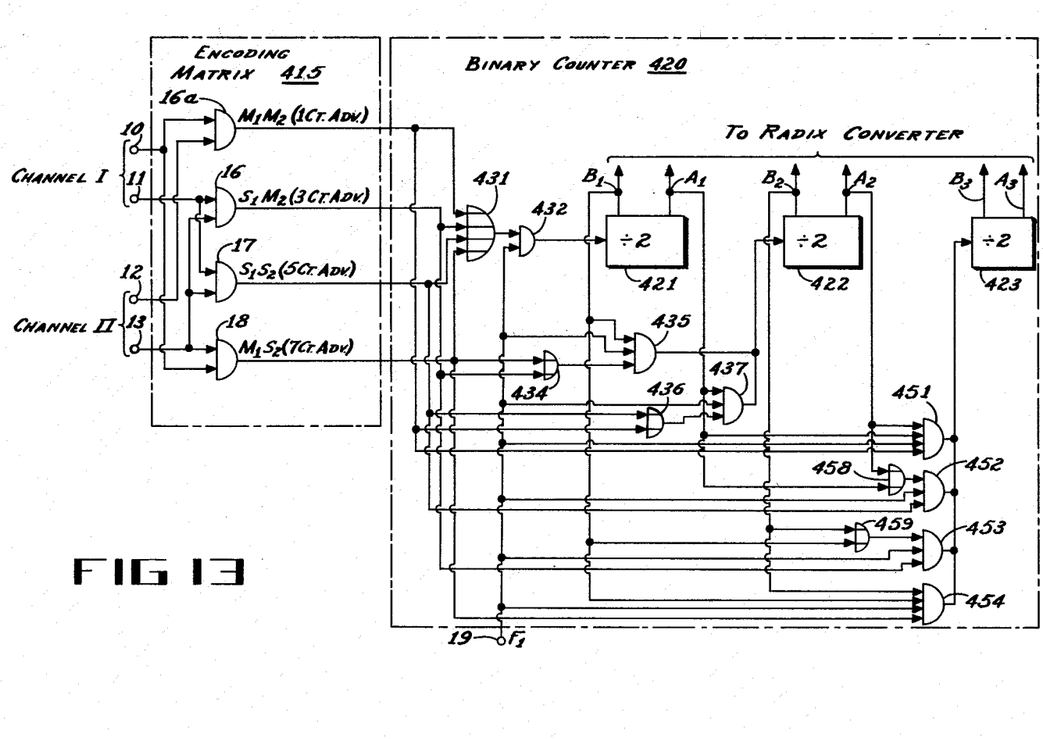

Nevertheless, even very-slight variations in phase-shift timing due to the delay elements can be avoided by using counter circuits of the type illustrated in FIGURES 12 and 13, which do not have delay elements. In these figures, all counter bistable circuits are triggered simultaneously by an $F_1$ timing pulse without any intervening delays.

Thus, in FIGURE 12, $F_1$ timing is provided from a terminal 19 to a counter 320 to selectively trigger its bistables 321 and 322 through respective "and" gates 332, 353, 354, or 356. The $F_1$ timing is not applied to encoding matrix 315; which is basically the same as encoding matrix 15 in FIGURE 1. Thus, its "and" gates have pairs of inputs connected in varying combinations to input terminals 10–13.

The two bistables 321 and 322 have respective pairs of outputs $A_1$, $B_1$ and $A_2$, $B_2$. Considering only the outputs at terminals $A_1$ and $A_2$ of counters 321 and 322, they have the standard binary-number output states for given counts as shown in the following table:

*Table III*

| Absolute Count | Terminal $A_1$ Bistable 321 | Terminal $A_2$ Bistable 322 |
| --- | --- | --- |
| 0 | 0 | 0 |
| 1 | 1 | 0 |
| 2 | 0 | 1 |
| 3 | 1 | 1 |

However, it is to be recalled that it is the number of counts *advanced* and not any particular absolute count that is important in the functioning of the invention. The logic for triggering the bistables in counter 320 is provided in Table IV. The column for each bistable indicates when that bistable must be triggered by the next $F_1$ pulse, to provide the required advance in output count given in the first column. $A_1=1$ means terminal $A_1$ of counter 321 is at 1 state, $A_1=0$ means it is at 0 state.

*Table IV*

| Output Count Advance | Bistable 321 to be triggered | Bistable 322 to be triggered |
| --- | --- | --- |
| 0 | None | None. |
| 1 | next $F_1$ pulse | $A_1=1$. |
| 2 | None | Every bit. |
| 3 | next $F_1$ pulse | $A_1=0$. |

Accordingly, a one-count advance is obtained by connecting the output of gate 16 through an "or" gate 331 to an input of an "and" gate 332, which has another input connected to timing terminal 19. Thus, each time a one-count advance is signified, an $F_1$ timing pulse is passed by gate 332 to trigger bistable 321. However, to complete the operation of the two-digit counter for a one-count advance, a second "and" gate 353 causes second bistable 322 to be triggered only when terminal $A_1$ of first bistable 321 is at output state 1. Thus, gate 353 has inputs connected to output terminal $A_1$ of bistable 321, timing terminal 19, and the output of "or" gate 331.

In order to advance the counter by two counts, another "and" gate 356 has an input connected to gate 17 and has a second input connected to timing terminal 19. Accordingly, each two-count-advance command causes an $F_1$ pulse to trigger bistable 322.

When a three-count advance is signalled by "and" gate 18, it provides an enabling input to "and" gate 332 and also to an "and" gate 354. Gate 354 also has inputs connected to timing terminal 19 and output terminal $B_1$ of bistable 321. Accordingly, upon data signifying a three-count advance, the next $F_1$ pulse triggers first bistable 321, but only triggers second bistable 322 if the first bistable happens to be providing a 0 output from its terminal $A_1$. And when both bistable circuits are triggered for a three count advance, they are both triggered by the same $F_1$ pulse without any added delays.

Encoding matrix 315 and counter 320 of FIGURE 12 may be directly substituted into FIGURE 1, in which case the four outputs of bistables 321 and 322 provide the four inputs 36–39 to radix converter 31.

FIGURE 13 illustrates a three-stage binary counter 420 in which any output count can be triggered simultaneously by a single $F_1$ timing pulse. It includes three bistables 421, 422 and 423. The output combinations at terminals $A_1$, $A_2$ and $A_3$ of the three bistables are provided in the following Table V:

*Table V*

| Absolute Count | Terminal $A_1$ Bistable 421 | Terminal $A_2$ Bistable 422 | Terminal $A_3$ Bistable 423 |
| --- | --- | --- | --- |
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |

However, it will be recalled again that it is not any absolute count of counter 420 that is important in the invention. Rather, it is the number of counts added to any previous absolute count.

The logic for triggering the bistables in counter 420 to obtain the phase-shifts in FIGURE 8 is provided in Table VI. The column for each bistable indicates when it must be triggered by the next $F_1$ pulse to provide the required advance in output count given in the first column. $A_1=1$; $A_1=0$; $A_2=1$; $A_2=0$ indicate the output states available at terminals $A_1$ and $A_2$ of bistables 421 and 422, respectively.

*Table VI*

| Output Count Advance | Bistable 421 to be triggered | Bistable 422 to be triggered | Bistable 423 to be triggered |
| --- | --- | --- | --- |
| 1 | next $F_1$ pulse | $A_1=1$ | $A_1=1$ and $A_2=1$ |
| 3 | do | $A_1=0$ | $A_1=1$ or $A_2=1$ |
| 5 | do | $A_1=1$ | $A_1=0$ or $A_2=0$ 0 |
| 7 | do | $A_1=0$ | $A_1=0$ or $A_2=0$ |

In FIGURE 13, an encoding matrix 415 is provided having four "and" gates. Matrix 415 includes an "and" gate 16a in addition to those in encoding matrix 315 of FIGURE 12. Gate 16a has inputs connected to terminals 10 and 12, so that it provides an output upon receiving $M_1M_2$ information that signifies a one-count advance for the counter.

Counter 420 is always advanced by an odd number of counts to permit the phase-coding shown in FIGURE 8. Therefore its first bistable 421 must be triggered by an $F_1$ pulse during each data bit provided to encoding matrix 415. This is done by connecting all outputs of matrix 415 through an "or" gate 431 to an input of an "and" gate 432. Thus, gate 432 passes each $F_1$ timing pulse to trigger bistable 421 while data is being provided to matrix 415.

However, the states of all three bistables must be considered whenever advancing the counter even by one count. This is done by providing "and" gates 437 and 451 to assure that bistables 422 and 423 are triggered properly to obtain a one-count advance from any output state of counter 420. Gate 437 has inputs connected to terminal $A_1$ of bistable 421, timing terminal 19, and to the output of gate 16a through an "or" gate 436. Gate 451 has inputs connected to terminal $A_2$ of bistable 422, terminal $A_1$ of bistable 421, $F_1$ timing terminal 19, and to the output of gate 16a.

When a three-count-advance command is provided from gate 16, it enables gate 432. But it also provides an enabling input to a pair of "and" gates 435 and 452. Gate 435 is enabled through an "or" gate 434, and has other enabling inputs connected to timing terminal 19, and to terminal $B_1$ of bistable 421. Gate 452 has an input connected by "or" gate 458 to terminals $A_1$ and $A_2$ of bistables 421 and 422. Other inputs of gate 452 are from timing terminal 19 and from gate 16. Accordingly, upon a three-count-advance command, the next timing pulse triggers bistable 421 always, triggers bistable 422 only if terminal $A_1$ is at a 0 state, and triggers bistable 423 only if either terminal $A_1$ or $A_2$ is at a 1 state.

For a five-count advancing command from gate 17, gates 437 and 453 may pass an $F_1$ pulse, while gate 432 does pass the $F_1$ pulse. Gate 437 passes it if terminal $A_1$ of bistable 421 is at a 1 output state, and gate 453 passes it only if either bistable 421 or 422 has its output terminal $A_1$ or $A_2$ at an output 0 state.

When a seven-count-advancing command is provided by gate 18, either gate 435 or 454 may pass the next timing pulse, while gate 432 does pass it. Gate 435 passes the timing pulse only if terminal $A_1$ of bistable 421 is at a 0 output state, and gate 454 passes the timing pulse only if both bistables 421 and 422 have their terminals $A_1$ and $A_2$ at 0 output states.

Encoding matrix 415 and counter system 420 of FIGURE 13 may be directly substituted in FIGURE 3. Furthermore, a counter system with seven or eight advancing counts may be provided in a like manner for substitution into FIGURE 4 to provide the phase-shifts of FIGURE 9 or 10.

Figure 14:
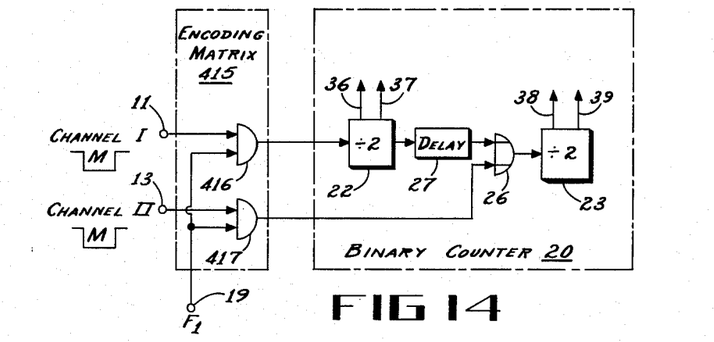
Figure 16:
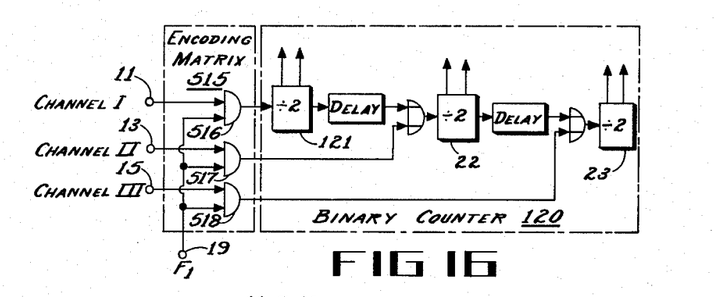

When both the counter and the input channels are binary, the encoding matrix can be simplified by choosing a phase-coding sequence directly related to the counting operation of the binary counter. This technique is used in FIGURES 14 and 16. In these figures, the encoding matrix is not a radix converter, but is a simple "and" gate matrix which changes the pulse form of the data; and it can have a minimum of $(N-1)$ "and" gates, rather than the $(2^N-1)$ encoding gates of the prior embodiments. The encoding matrix in each of FIGURES 14 and 16 changes the pulse form of the incoming data from a direct-current level to an $F_1$ pulse for a "space" bit and to no pulse for a "mark" bit. In FIGURES 14 and 16, the pulse-converted binary data is used directly to trigger the binary counter to advance its output state. The multichannel data has a combined form at the counter output.

In FIGURE 14, encoding matrix 415 comprises "and" gates 416 and 417, which have inputs respectively receiving the two channels of data. Each gate also has an input connected to terminal 19 to receive timing pulses. The output of gate 416 is connected to an input of divider 22; while an output of gate 417 is connected to an input of divider 23 through "or" gate 26. Thus, the counter stages are directly controlled by outputs of the respective "and" gates of encoding matrix 415. Bistable 14 is triggered only by a "space" bit of the first channel, and bistable 22 is triggered only by a "space" bit of the second channel.

Figure 15:
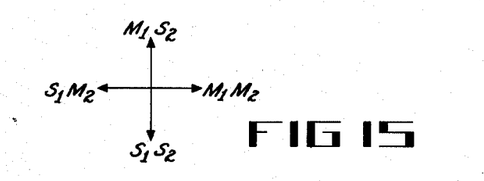

The two-channel phase-coding sequence of FIGURE 15 is used with FIGURE 14. It is different than the phase coding in FIGURE 7, and illustrates that phase coding is not rigid. The phase coding in FIGURE 14 corresponds to the binary number sequencing of the counter, as shown by the following table:

Table VII

| Data Combination | Binary Count Advance | | Phase Shift, degrees |
|---|---|---|---|
| $M_1M_2$ | 0 | 0 | 0 |
| $M_1S_2$ | 0 | 1 | −90 |
| $S_1M_2$ | 1 | 0 | −180 |
| $S_1S_2$ | 1 | 1 | −270 |

Figure 17:
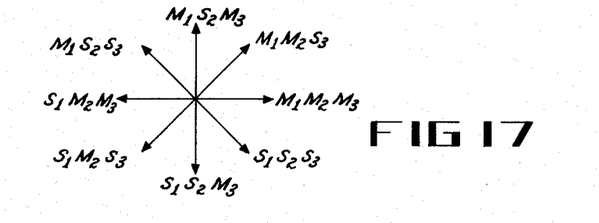

In FIGURE 16, encoding matrix 515 includes three "and" gates 516, 517 and 518, which respectively have inputs receiving data from three independent channels. Their other inputs are connected to timing source 19. The outputs of these "and" gates are connected to inputs of the respective divider stages in counter 120. The three channel phase-coding sequence of FIGURE 17 is used with FIGURE 16. It is different from the phase coding of FIGURE 3 and corresponds to the binary number sequencing of the input code. The phase coding for FIGURES 16 and 17 is given in the following table:

Table VIII

| Data Combination | Binary Count Advance | | | Phase Shift, degrees |
|---|---|---|---|---|
| $M_1M_2M_3$ | 0 | 0 | 0 | 0 |
| $M_1M_2S_3$ | 0 | 0 | 1 | −45 |
| $M_1S_2M_3$ | 0 | 1 | 0 | −90 |
| $M_1S_2S_3$ | 0 | 1 | 1 | −135 |
| $S_1M_2M_3$ | 1 | 0 | 0 | −180 |
| $S_1M_2S_3$ | 1 | 0 | 1 | −225 |
| $S_1S_2M_3$ | 1 | 1 | 0 | −270 |
| $S_1S_2S_3$ | 1 | 1 | 1 | −315 |

The remainder of the circuit following that shown in FIGURE 14 may be identical to that given in FIGURE 1 or 2. Also an additional first divider stage may be provided in binary counter 20 to obtain a phase-stepping arrangement as was obtained by adding bistabel 121 in counter 120 of FIGURE 3, and its following circuitry.

Furthermore, the three-channel arrangement in FIGURE 16 may include the circuity following binary counter 220 in FIGURE 4. Also, the system of FIGURE 16 can be made to accommodate a phase-stepping arrangement by providing an additional input divider within the counter and triggering it by the $F_1$ pulses from terminal 19, in the manner previously mentioned.

Still further, encoding matrix 415 or 515 can also be used with instantaneous binary counters of the type shown in FIGURES 12 and 13 which do not include added internal delay elements.

It is obvious after studying these embodiments that they may be operated by retarding instead of advancing their counter or by a combination of both.

Although this invention has been described with respect to particular embodiments thereof, it is not to be so limited, as changes and modifications may be made therein which are within the spirit and scope of the invention as defined by the appended claims.

We claim:

1. A phase-pulse modulator for encoding a plurality of independent data channels upon a given frequency, comprising an encoding matrix having a plurality of separate outputs, each output corresponding to a particular phase-shift required of said modulator, a counter having plural inputs, means connecting its plural inputs to the outputs of said encoding matrix, each matrix output triggering said counter to retard or advance its output count by a respective number of counts, signal generating means including phase shifter means for simultaneously providing a plurality of differently-phased waves at said given frequency, and phase-selector switching means for connecting one of the waves of said phase-shifter to an output of said modulator in response to a particular output state of said counter.

2. A modulator as defined in claim 1 in which said phase-shifter includes means for stepping its output phase by an additional $360°/2^{(N+1)}$ per signal-bit period, where N is the number of input channels.

3. A system for phase-pulse modulating a plurality of independent channels of binary data upon a given frequency, comprising an encoding matrix of "and" circuits receiving inverted and noninverted input signals of each of said channels, inputs to said "and" circuits receiving said input signals in differing combinations, a binary counter capable of counting at least to $2^N$, said counter having its output count advanced or retarded according to respective outputs of said encoding matrix, radix-converter means for converting said counter output from binary form to an output having the form of a radix of at least $2^N$, signal generating means including phase-shifter means for simultaneously providing at least $2^N$ outputs having different phases of said frequency, means for selectively connecting one of the outputs of said phase-shifter means as an output of said system in response to the outputs of said radix-converter means.

4. A phase-pulse modulator for encoding a plurality N of independent data channels upon a given frequency, comprising an encoding matrix receiving said N number of channels and having plural outputs, digital counter means receiving the outputs of said encoding matrix and having its output count advanced or retarded by particular numbers of counts corresponding to the respective outputs of said encoding matrix, signal generating means including phase-shifter means for simultaneously providing a plurality of differently phased waves at said given frequency, and phase-selector switching means for connecting one of the waves of said phase-shifter means to an output of said modulator in response to a particular count of said digital counter means.

5. A phase-pulse modulator for encoding any number N of independent binary data channels upon a given frequency, comprising an encoding matrix having at least $(2^{N-1})$ outputs, inputs of said independent data channels being received by said encoding matrix, a binary counter having inputs connected to outputs of said encoding matrix, said binary counter having at least N bistable stages, means connecting said bistable stages to outputs of said encoding matrix to obtain substantially instantaneous count advancement or retardation of the output states of said binary counter, radix converter means connected to outputs of said binary counter to provide $2^N$ outputs corresponding to the respective output states of said counter, signal generating means including phase-shifter means providing at least $2^N$ waves having different phases at said given frequency, phase switching means receiving the outputs of said phase shifter means and said radix converter, said switching means connecting a single output wave of said phase shifter means as the output of said modulator in response to a particular output count of said binary counter.

6. A phase-pulse modulator for encoding any number N of independent binary data channels upon a given frequency, comprising an encoding matrix having at least $2^N-1$ "and" gates, inputs of said "and" gates receiving said input binary channels in differing combinations, a binary counter having at least N number of bistable sections, gating means connecting outputs of said encoding matrix to said binary counter to advance or retard its output count by a particular number of counts related to the respective outputs of said encoding matrix, a radix converter connected to outputs of said binary counter, a phase-selector switching means actuated by outputs of said radix converter, signal generating means including phase generating means for providing at least $2^N$ different phased waves at said given frequency as inputs of said phase-selector switching matrix, said phase-selector switching matrix connecting one of said phased waves to an output of said modulator in response to a particular state of said radix converter.

7. A phase-pulse modulator, as defined in claim 6 for encoding two channels of data, wherein three "and" gates comprise said encoding matrix to provide three outputs of said encoding matrix.

8. A modulator, as defined in claim 6, in which means is provided to step the output phase by an additional $360°/2^{(N+1)}$ per input data-bit period.

9. A phase pulse modulator, as defined in claim 8, in which said stepping means is connected to the output of said phase-selector switching matrix.

10. A modulator, as defined in claim 8 in which said phase generating means includes means for stepping all of its outputs by $360°/2^{(N+1)}$ per input data-bit period.

11. A modulator, as defined in claim 8, in which said binary counter includes an additional first bistable stage, and means for triggering said first stage at each input data-bit period.

12. A phase-pulse modulator for encoding three independent binary channels upon a given frequency, comprising an encoding matrix having at least seven "and" gates receiving said three channels in differing combinations, said encoding matrix providing at least seven outputs in which a different output is actuated for any given input data combination of said channels, a binary counter, means connecting said counter to said outputs of the encoding matrix for advancing or retarding the output state of said binary counter by a particular number of counts corresponding to the respective outputs of said encoding matrix, signal generating means including phase-shifter means for providing at least eight output waves having different phases of said given frequency, a radix-converter phase-selector matrix receiving the waves of said phase-shifter means and outputs of said binary counter, said matrix connecting one of said waves to the output of said modulator for a given output state of said binary counter.

13. A modulator as defined in claim 12 in which stepping means is provided for phase stepping the output of said modulator by a fixed phase increment per input data-bit period.

14. A phase-pulse modulator for encoding a plurality N of independent binary data channels upon a given frequency, comprising an encoding matrix having at least $2^{N-1}$ "and" gates, said input channels being provided in both inverted and non-inverted form to said "and" gates, with said "and" gates each having N inputs in differing combinations of said channel inputs, a binary counter having at least N number of bistable stages, gating means connecting inputs of said binary counter to respective outputs of the "and" gates in said encoding matrix, different outputs of said encoding matrix enabling instantaneous advancement or retardation of the output count of said counter by a particular number of counts corresponding to the respective outputs of said encoding matrix, radix-converter and phase-selector matrix means having first and second sets of inputs, said first set of inputs being connected to said counter outputs, a source of differently phased wave outputs at said given frequency, with said differently phased wave outputs being connected to said second set of inputs of said matrix means, said matrix selecting one of said differently phased waves as the output of said modulator in response to a particular output count of said binary counter.

15. A modulator, as defined in claim 14, in which said differently phased output waves are separated by $360°/2^N$.

16. A modulator, as defined in claim 15, including means for stepping the output phase of said modulator by an additional $360°/2^{(N+1)}$ per input data-bit period.

17. A modulator, as defined in claim 16, in which said differently phased outputs are $2^{(N+1)}$ in number, said binary counter including (N+1) bistable stages, and bit-period timing triggering the first stage of said counter.

18. A phase-pulse modulator for encoding a plurality N of independent binary data channels upon a given frequency, comprising an encoding matrix receiving said data channels, said encoding matrix having at least N outputs, binary counter means receiving the outputs of said encoding matrix and having at least N bistable stages having inputs connected to outputs of said encoding matrix to advance or retard the output count by a particular number of counts corresponding to respective outputs of said encoding matrix, signal generating means including phase-shifter means for simultaneously providing a plurality of differently phased waves at said given frequency, and phase-selector switching means for connecting one of said waves to an output of said modulator in response to a particular output count of said digital counter means.

19. A modulator as defined in claim 18 in which said encoding matrix comprises N number of "and" gates respectively having inputs receiving said data channels, and a data timing source being connected to another input of each "and" gate.

20. A modulator as defined in claim 18 in which phase stepping means is provided to add $360°/2^{(N+1)}$ per data bit period.

References Cited in the file of this patent

UNITED STATES PATENTS

| | | |
|---|---|---|
| 2,833,857 | Robin | May 6, 1958 |
| 2,833,917 | Babcock | May 6, 1958 |
| 2,870,431 | Babcock | Jan. 20, 1959 |
| 2,915,633 | Barry | Dec. 1, 1959 |
| 2,994,790 | Delaney | Aug. 1, 1961 |